United States Patent
Alberts

(10) Patent No.: US 6,676,082 B2
(45) Date of Patent: Jan. 13, 2004

(54) SELF-ADAPTING ESCAPE SLIDE

(75) Inventor: Jeff H. Alberts, Brier, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 10/044,184

(22) Filed: Oct. 26, 2001

(65) Prior Publication Data

US 2003/0080254 A1 May 1, 2003

(51) Int. Cl.[7] .................................................. B64D 9/00
(52) U.S. Cl. ................................... 244/137.2; 244/905
(58) Field of Search .............................. 244/905, 137.2; 193/2 R, 25 B; 182/48, 49; 441/40, 80, 83

(56) References Cited

U.S. PATENT DOCUMENTS

| | | | |
|---|---|---|---|
| 2,936,056 A | | 5/1960 | Heyniger |
| 3,554,344 A | | 1/1971 | Summer et al. |
| 3,669,217 A | * | 6/1972 | Fisher ............................ 182/48 |
| 3,833,088 A | * | 9/1974 | Chacko et al. ................ 182/48 |
| 3,866,734 A | * | 2/1975 | Elkins et al. ................. 137/512 |
| 4,013,247 A | * | 3/1977 | Giffin ............................ 182/48 |
| 4,246,980 A | | 1/1981 | Miller |
| 4,723,628 A | * | 2/1988 | Fisher ............................ 182/48 |
| 5,360,186 A | * | 11/1994 | Danielson et al. ......... 193/25 B |
| 5,542,628 A | * | 8/1996 | Nishimura et al. ............ 182/48 |
| 5,738,305 A | * | 4/1998 | Pruitt ............................ 182/48 |
| 5,820,773 A | * | 10/1998 | Hintzman et al. ............. 182/48 |
| 5,875,868 A | | 3/1999 | Smialowicz et al. |
| 5,975,467 A | | 11/1999 | O'Donnell et al. |
| 6,298,970 B1 | * | 10/2001 | Targiroff et al. .............. 193/25 |

FOREIGN PATENT DOCUMENTS

| | | | | |
|---|---|---|---|---|
| GB | 2061847 A | * | 5/1981 | ............ B64D/25/14 |

* cited by examiner

Primary Examiner—Peter M. Poon
Assistant Examiner—Timothy D Collins
(74) Attorney, Agent, or Firm—Black Lowe & Graham

(57) ABSTRACT

The present invention comprises a system for determining and adjusting the angle at which an escape slide is oriented. The system comprises an inflatable slide having a primary inflatable slide segment and at least one additional slide segments attached to the primary slide segment. Additionally, a state sensor configured to determine the attitude of the slide when inflated is attached to the slide or to structure surrounding the slide. Further, the system includes an inflation gas source coupled to the primary and at least one additional inflatable slide segments and an inflation controller in communication with the inflation gas source and the state sensor. The gas source and the state sensor operate to cause the gas source to adjust the at least one additional slide segments as a function of the attitude measured by the state sensor.

20 Claims, 4 Drawing Sheets

US 6,676,082 B2

SELF-ADAPTING ESCAPE SLIDE

FIELD OF THE INVENTION

This invention relates generally to emergency escape slides and, more specifically, to an adjustable escape slide that adapts to adverse airplane attitudes or other conditions that affect the slide angle.

BACKGROUND OF THE INVENTION

Aircraft evacuation slides are designed to accommodate an apriori sill height and be of an appropriate length to provide an appropriate slide angle under normal conditions. When a commercial airplane lands in certain adverse conditions, such as an engine coming off in conjunction with certain gear-out conditions, the resulting airplane altitude can render existing escape slides unusable at some doors. The angle of the slide must be within a certain allowable ranges to be effective. Outside of these ranges the slide angle is either too shallow to allow sufficient speed, or too steep to allow a safe egress.

Moreover, the escape slides are made of an appropriate length that is also dependent upon the size or model of aircraft the escape slides is used on. This may result in escape slides that are limited only for use on specific fleet airplanes and/or door locations. Ultimately, this leads to market deficiencies because not only are markets required to make additional escape slide variations in part numbers, and designs but also it increases the amount of certifications required.

SUMMARY OF THE INVENTION

The present invention comprises a system for determining and adjusting the angle at which an escape slide is oriented. The system comprises an inflatable slide having a primary inflatable slide segment and at least one additional slide segments attached to the primary slide segment. Additionally, a state sensor configured to determine the attitude of the slide when inflated is attached to the slide or to structure surrounding the slide. Further, the system includes an inflation gas source coupled to the primary and at least one additional inflatable slide segments and an inflation controller in communication with the inflation gas source and the state sensor. The gas source and the state sensor operate to cause the gas source to adjust the at least one additional slide segments as a function of the attitude measured by the state sensor.

The present invention further comprises a method for employing an inflatable escape slide wherein the angle of the escape slide is measured or predicted then subsequently adjusted to place the slide in an optimal slide geometry, regardless of aircraft orientation. The method includes deploying a primary inflatable slide segment by releasing the slide segment and inflating, at substantially the same time activating a timing device or pressure sensor. Upon passage of a predetermined amount of time or achieving a desired slide pressure the slide angle is measured or the slide angle is predicted relative to vertical. Next, a determination is made whether the slide angle is within operating tolerances or not. If the slide is within operating tolerances, slide use may begin. However, if the slide use is not within allowable operating tolerances then an at least one additional slide segment attached to the primary slide segment is inflated or deflated to achieve proper slide geometry. Once proper slide geometry is achieved, slide use may commence.

As will be readily appreciated from the foregoing summary, the invention provides and efficient system and method for orienting an escape slide such that optimal slide geometry is achieved regardless of aircraft attitude, size or model.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
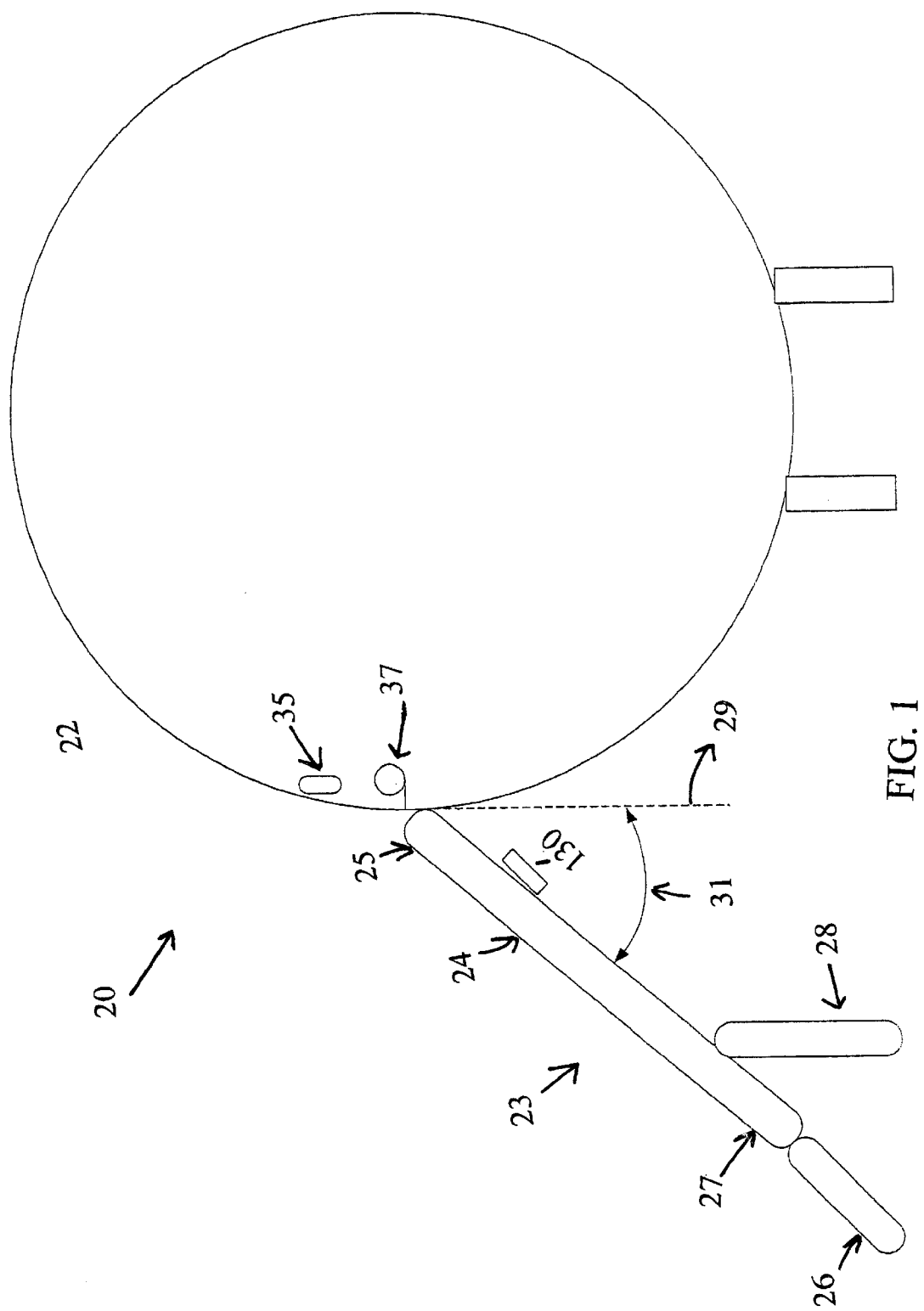
FIG. 1 is a frontal view of the invention.

FIG. 1 depicts an evacuation slide deployment 20. The slide deployment 20 includes a slide 23 employable to slidably transfer people, animals, or inanimate objects from an elevated position to a lower position. In a presently preferred embodiment, the slide deployment 20 is attached to an aircraft 22 and is an evacuation slide. However, other employment environments are considered within the scope of this invention. More specifically, maritime vessels, amusement devices, buildings, large construction or mining equipment, or any other environment in which a temporary need exists to transfer people or property from a position of height to a lower position.

The slide 23 includes a primary inflatable slide segment 24 having a first end 25 and a second end 27 and at least one additional slide segment 26 attached to the second end 27 of the primary slide segment 24. The first end 25 of the primary slide segment 24 is attached to an aircraft 22 at an access point, for example, a doorway. At least one vertical slide support segment 28 can be attached to a bottom surface of the slide 23. When deployed, the slide 23 forms a slide angle 31 relative to a reference plane 29. In a preferred embodiment, the reference plane 29 is a vertical plane passing. However, any plane of reference is considered within the scope of this invention.

The primary slide segment 24, additional slide segments 26, vertical slide support segment 28 are all in fluid communication with one another and with a gas source 37. The gas source can be attached to the slide 23, or it can be attached to the aircraft 22. In a preferred embodiment, the gas source 37 is a compressed gas chamber wherein upon activation of a valve the compressed gas is introduced into the inflatable slide 23. However, any other gas source is considered within the scope of this invention, for example, an oxidizing process.

The slide deployment 20 includes a state sensor 30. In a preferred embodiment, as depicted in FIG. 1, the state sensor is located on an external surface of the primary slide segment 24. However, the state sensor can be located at any location on the slide 23, either internally or externally. Alternatively, the state sensor 30 can be attached to aircraft 22. Regardless of location, the state sensor is in communication with the slide 23 and the gas source 37.

A deployment attitude sensor 35 is also employable with this invention. The deployment attitude sensor 35 measures the attitude of the deployment site prior to deployment of the slide. More specifically, the sensor 35 measures an angle, relative to a predetermined reference point, and determines the number of additional slide segments 26 that must be employed in order to deploy the slide 23 such that the slide angle 31 is within a optimal operating range. The deployment sensor 35 can be employed singularly, or in conjunction with any other sensor arrangement.

Figure 2:
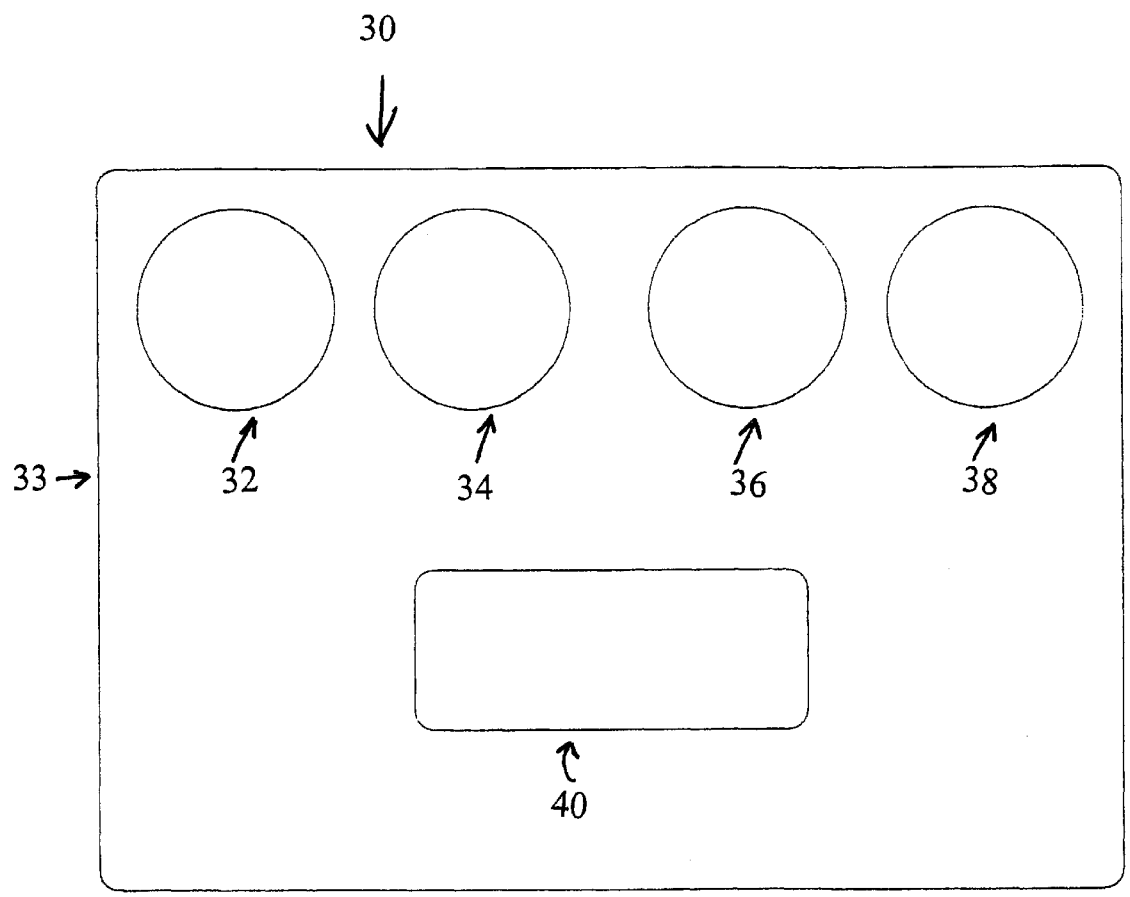
FIG. 2 is a top view of the state sensor.

FIG. 2 depicts the state sensor 30. The sensor 30 includes a housing 33 having a plurality of electrical components contained within. In a preferred embodiment, the housing 33 contains a power source 40, a position sensor 32, a programmable position decoder 34, a timer and/or pressure sensor 36 and an inflation device or trigger 38. However, any variety of electrical components can be included within the state sensor without exceeding the scope of this invention.

In a preferred embodiment, each sensor, or electrical component of the state sensor 30, can be in communication with sensory devices located outside of the housing 33 (not shown). Thus, the state sensor 30 can receive data from areas remote from the state sensor 30. Conversely, the state sensor 30 can contain all of the sensory devices and electrical components within the housing 33. In this manner, external connections are not necessary. For example, the power source 40 can be a battery or other local power source.

Figure 3:
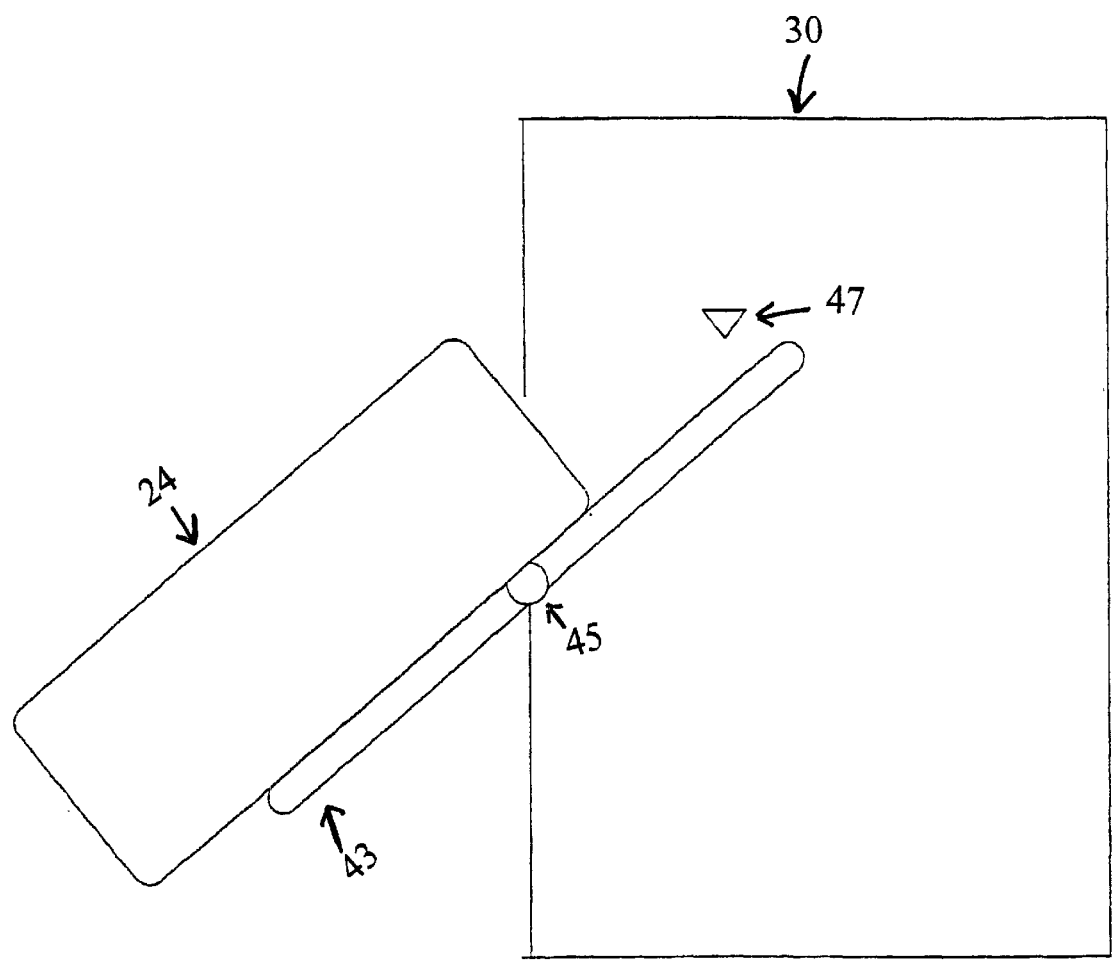
FIG. 3 is a frontal view of the contact sensor.

The position sensor can take a variety of forms. In a preferred embodiment, the position sensor is an electrolytic inclination sensor. However, any other position sensor is considered within the scope of the invention. For example, FIG. 3 depicts a contact switch sensor 30 arrangement. More specifically, a portion of a semi-rigid sensor arm 43 is attached to the primary slide segment 24 such that the attitude of the slide segment 24 is transferred to the sensor arm 43. The sensor arm 43 is pivoted about a point 45. As the sensor arm 43 pivots, the sensor arm 43 engages at least one contact switch 47, or contact switch array 47 thereby indicating the attitude of the slide 23. Likewise, optical sensors, electronic inclination sensors, mercury tilt switches and other sensory devices are considered within the scope of this invention.

Figure 4:
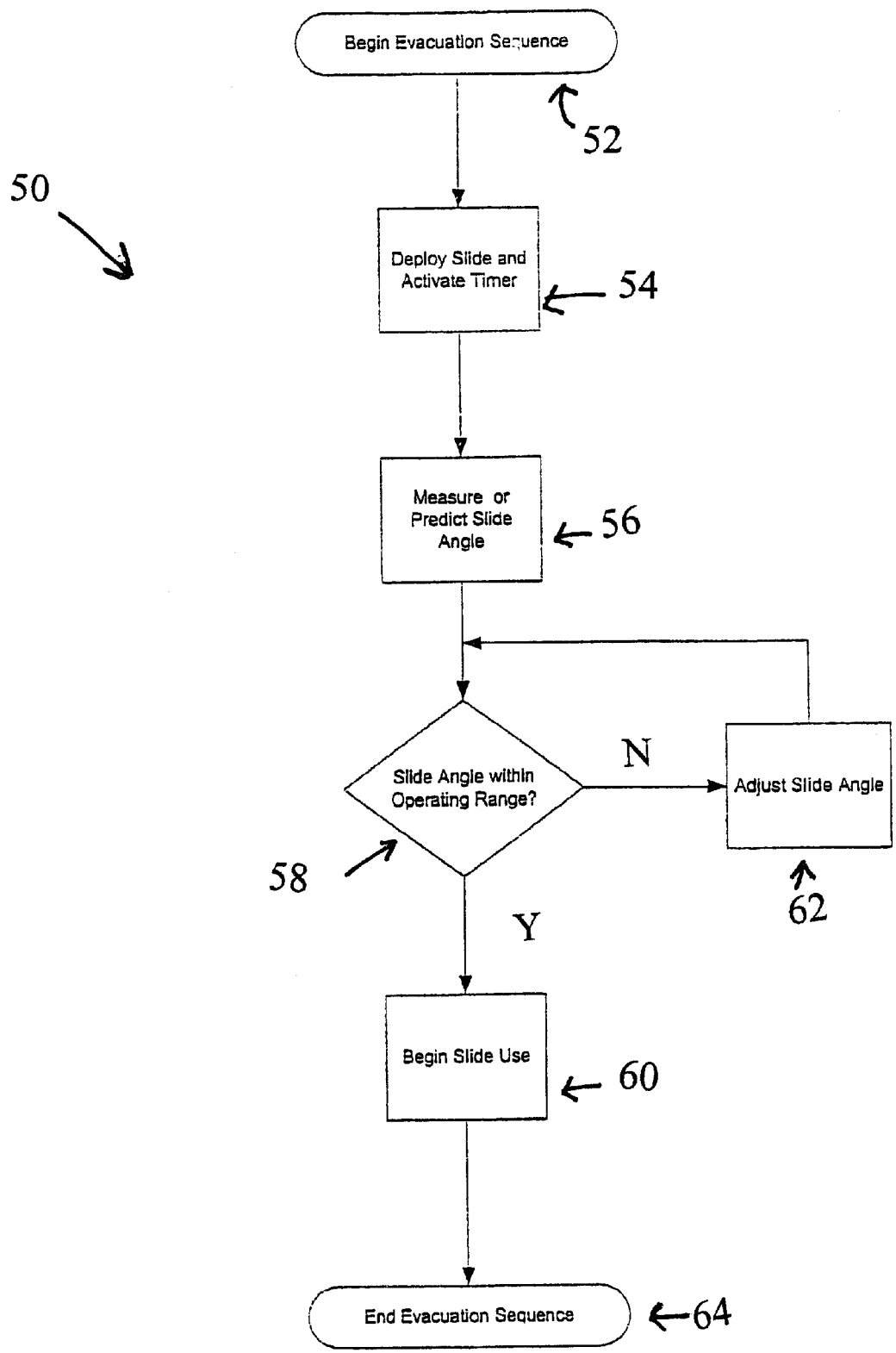
FIG. 4 is a flowchart of the process employed in accordance with the present invention

FIG. 4 depicts a preferred embodiment of the slide deployment sequence 50. More specifically, the deployment sequence 50 depicts a general process, which when preformed, yields a consistent, reliable, and optimally configured slide geometry regardless of aircraft attitude.

Step 52 initiates the deployment sequence 50. The initiation can be a manual or automatic process. However, in a preferred embodiment, the initiation is a manual removal of an aircraft access point cover, for example, a door, and the manual initiation of the slide deployment 50.

Following step 52 is a slide deployment, step 54. Deployment step 54 includes the initial inflation of the slide 23 and at substantially the same moment, the activation of either a timer 36, a pressure sensor 32 (see FIG. 2) or both. The inflation device 38 controls inflation of the slide 23. The timer 36 and the pressure sensor 32 both serve the same initial purpose. More specifically, the elements allow the slide to inflate enough to allow for an accurate initial slide angle measurement. Thus, the slide measurement can be made at any time during the deployment. In the instance where the slide is not fully deployed, the slide angle 31 may be predicted based upon the slide geometry when the time ore pressure reading is taken.

The initial measurement of the slide angle is indicated by step 56. The position sensor 32 performs the slide angle 31 measurement. The slide angle 31 is preferably measured relative to a vertical plane passing through the aircraft access point. However, measuring the slide angle 31 relative to any other plane is considered with the scope of the invention After the initial measurement or prediction of the initial slide angle, a determination is made whether the slide angle 31 is within an optimal operating range, as indicated by step 58. The programmable position decoder 34 preferably makes this determination. If the slide angle 31 is within a optimal operating range the slide can be used as indicated by the step 60 until the evacuation deployment sequence 50 is complete, step 64.

When the slide angle 31 is not within a proper operating range the slide angle must be adjusted, step 62. More specifically, the position decoder must make a determination whether the angle is too steep or too shallow. In the instance where the angle 31 is too steep, a signal is passed to the inflation device 38 to allow the gas source 37 to further inflate the additional slide segment 26 thereby increasing the slide length. Conversely, if the angle 31 is too shallow, the additional segment can be deflated in order to shorten the slide length and increase the slide gradient. The deflation can be performed in a variety of ways. For example, in a preferred embodiment a squib (not shown) may be detonated, forming a hole in the at least one additional slide segment 26 thereby deflating the segment 26. The position sensor 32 monitors the slide angle 31 and when the position decoder 34 determines that an adequate slide angle 31 is obtained the adjustment ceases. Upon obtaining the adequate slide angle 31, the slide 23 may be used and ultimately the evacuation sequence can terminate, step 64.

While the preferred embodiments of the invention has been illustrated and described, as noted above, many changes can be made without departing from the spirit and scope of the invention. For example, initially the slide may fully inflate all segments and subsequently deflate some or all of the additional segments as necessary. Additionally, the slide may initially only inflate the primary slide segment with additional slide segments deployed as necessary, or any combination of the above description. Accordingly, the scope of the invention is not limited by the disclosure of the preferred embodiment. Instead, the scope of the invention should be determined entirely by reference to the claims that follow.

What is claimed is:

1. An inflatable slide, comprising:
    a primary inflatable slide segment;
    a means for supporting the primary inflatable slide segment, the support means attached to the primary slide segment and adapted to extend from the primary slide segment vertically downward to provide support when inflated, at least one additional slide segment attached to the primary slide segment such that the primary slide segment and at least one additional slide segments together define a slide length when inflated, and further wherein the additional slide segments increase the slide length when inflated;
    a state sensor configured to determine an attitude slide;
    an inflation gas source coupled to the primary and at least one the additional inflatable slide segments; and,
    an inflation controller in communication with the inflation gas source and the state sensor to cause the gas source to inflate one or more of the at least one additional slide segments as a function of the attitude measured by the state sensor, thereby increasing the slide length.

2. The slide of claim 1, wherein the state sensor is an electrolytic inclination sensor.

3. The slide of claim 1, wherein the state sensor is a semi-rigid sensor arm and contact sensor array.

4. The slide of claim 1, wherein the inflation gas source is a compressed gas and further wherein the slide comprises a slide angle defined by a line extending through the primary slide segment and a vertical reference plane, such that the slide angle is increased when the additional slide segments are inflated to position the primary slide segment at an angle that will facilitate sliding of an exiting passenger.

5. The slide of claim 1, wherein the inflation gas source is an oxidation process.

6. The slide of claim 1, wherein the state sensor is attached to the slide.

7. The slide of claim 1, further comprising a deployment attitude sensor.

8. The slide of claim 1, wherein upon initial deployment, the primary slide segment and the additional slide segments are inflated, and if necessary, at least one of the additional slide segments are deflated to obtain optimal slide geometry.

9. The slide of claim 1, wherein upon initial deployment, only the primary slide segment is inflated, at least one of the additional slide segments being inflated as necessary to attain optimal slide geometry.

10. An aircraft escape slide, comprising:
    a primary inflatable slide segment having a top side, a bottom side, a first end and a second end, the first end attached to an aircraft access point; an inflatable slide support segment attached to the bottom side of the primary slide segment and adapted to extend from the bottom side of the primary side segment vertically downward to provide support when inflated;
    at least one additional slide segment attached to the primary slide segment adjacent the second end of the primary slide segment, such that when inflated the primary slide segment and the at least one additional slide segments together define a slide length and further wherein the additional slide segments increase the slide length when inflated;
    a state sensor configured to determine the attitude of the aircraft at the aircraft access point and the number of the additional slide segments to be pressurized in order to achieve a desired slide angle;
    an inflation gas source coupled to the primary and at least one additional inflatable slide segments; and the slide support segment and,
    an inflation controller in communication with the inflation gas source and the state sensor to cause the gas source to automatically pressurize the slide support segment the primary slide segment and one or more of the at least one additional slide segments as a function of the attitude measured by the state sensor, thereby increasing the slide length.

11. The slide of claim 10, wherein the state sensor is a electrolytic inclination sensor.

12. The slide of claim 10, wherein the state sensor is a mercury contact sensor array.

13. The slide of claim 10, wherein the inflation gas source is a compressed gas.

14. The slide of claim 10, wherein the inflation gas source is an oxidation process.

15. The slide of claim 10, wherein the state sensor is attached to the aircraft.

16. The slide of claim 10, further comprising a predicting the slide attitude based upon the attitude of the aircraft access point.

17. The slide of claim 10, wherein upon initial deployment, the primary slide segment and the additional slide segments are inflated, and if necessary, at least one of the additional slide segments are deflated to obtain optimal slide geometry.

18. The slide of claim 10, wherein upon initial deployment, only the primary slide segment is inflated, at least one of the additional slide segments being inflated as necessary to attain optimal slide geometry.

19. A method of deploying an aircraft escape slide, comprising:
    deploying a slide attached to an aircraft, the slide having a primary inflatable slide segment attached to a plurality of additional slide segments permanently attached to the primary inflatable slide segment, wherein the additional slide segments increase the slide length when inflated;
    activating a timing device or pressure sensor;
    waiting a pre-determined time or until a pre-determined pressure is achieved;
    determining a slide angle;
    determining if the slide angle is within operating slide angle tolerances;
    adjusting the slide angle, if necessary, via pressure control within the at least one additional slide segment in order to bring the slide angle within operating tolerances and deploying a slide support segment to provide vertical support for the primary slide segment.

20. The method of claim 19, wherein the step of determining slide angle further comprises predicting an inflated slide geometry.

* * * * *